(No Model.)
F. E. KOHLER.
EXTENSIBLE STEP LADDER.
No. 357,676. Patented Feb. 15, 1887.
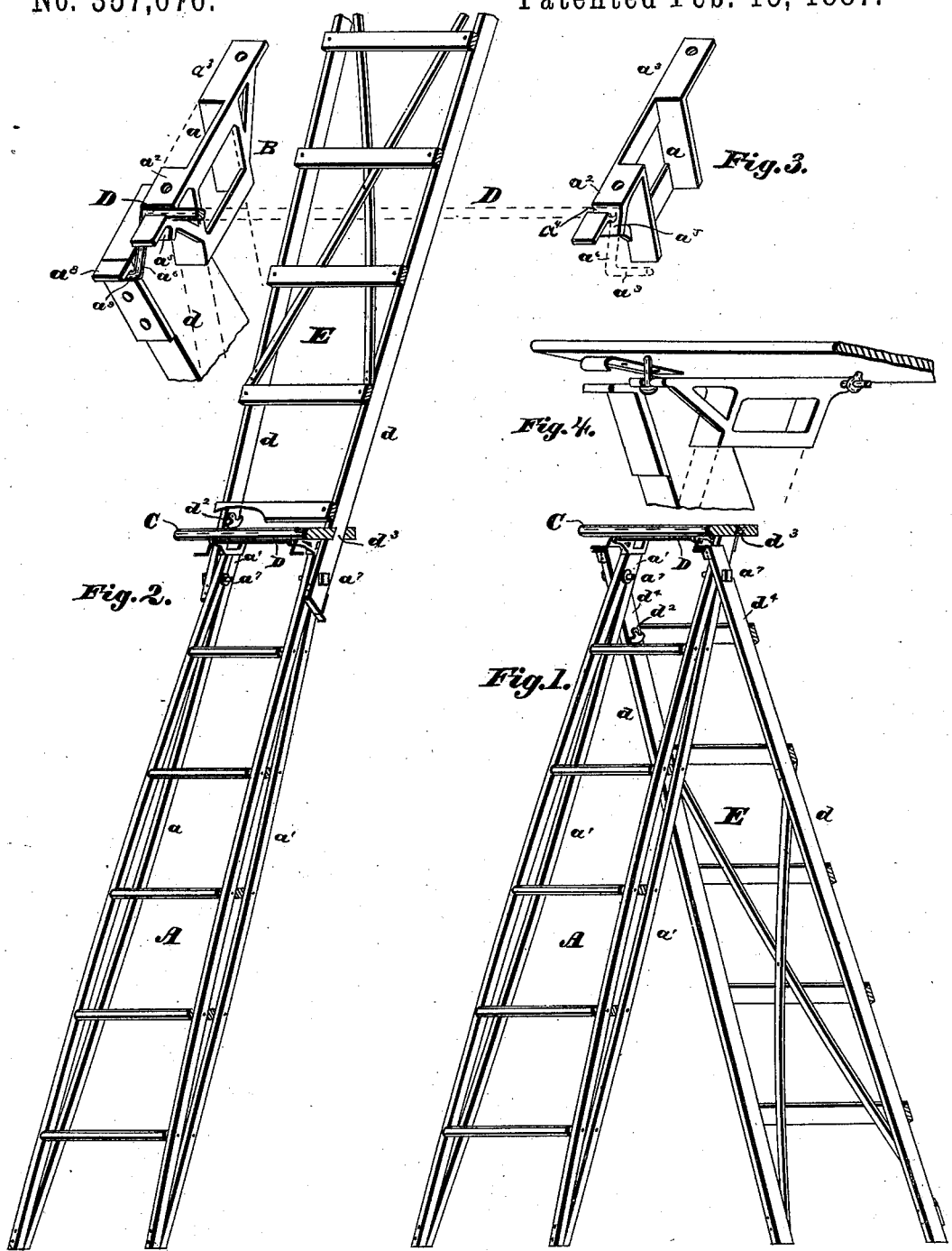
WITNESSES: Harry Grease, Chas. R. Miller
Frederick E. Kohler INVENTOR
BY W. K. Miller ATTORNEY

UNITED STATES PATENT OFFICE.

FREDERICK E. KOHLER, OF CANTON, OHIO.

EXTENSIBLE STEP-LADDER.

SPECIFICATION forming part of Letters Patent No. 357,676, dated February 15, 1887.

Application filed November 20, 1886. Serial No. 219,461. (No model.)

*To all whom it may concern:*

Be it known that I, FREDERICK E. KOHLER, a citizen of the United States, and a resident of Canton, county of Stark, State of Ohio, have invented a new and useful Improvement in Extensible Step-Ladders, of which the following is a full, clear, and exact description, reference being had to the accompanying drawings, making part of this specification.

My invention relates to improvements in extensible step-ladders; and it consists of the hereinafter-described means for supporting and automatically locking the ladder in an extended or folded position.

My invention also relates to the detail and combination of parts, as set forth in the claims.

Figure 1 is an isometrical view of an extensible step-ladder embodying my improvements, showing the ladder in the form of an ordinary step-ladder. Fig. 2 is an isometrical view of the ladder extended. Fig. 3 is a view of parts detached, showing the detail which will be hereinafter lettered and described. Fig. 4 shows a modified form of my improvements which may form the subject-matter of a subsequent application, and will not be described at this time.

Letter A represents the front and lower section of a step-ladder, which may be made of any of the well-known and approved forms, having on its upper end a plate, B, that may be made of any suitable metal, preferably malleable cast-iron, said plate having a socket, $a$, adapted to receive the end of the side bar $a'$ of section A. Said plate is also provided with projections $a^2$ and $a^3$, as a support for the foot-board C. The projection $a^2$ is provided with a journal-bearing, $a^4$, adapted to receive the locking-bar D, and is also provided with a downwardly-projected shoulder, $a^5$, for the bent portion $a^6$ of the bar D to rest upon, and to prevent its dropping below a given point, for the purpose hereinafter described.

Section E is formed substantially as shown in the drawings, or may be varied to suit circumstances, and has a pivoted connection, $a^7$, with section A near its upper end, and is provided with hooks $a^8$, as hereinafter explained.

The bar D is bent at each of its ends in crank form, having a downwardly and outwardly projected section, $a^6$, and an outwardly-projected section, $a^9$.

On side bar $d$, section E, there is provided a locking-cam, $d^2$, loosely pivoted to said side bar, for the purpose of locking the frame E in extended position, as shown in Fig. 2.

The foot-board C is secured to the plate B, and is cut away at the corners, forming the shoulders $d^3$, as shown in Figs. 1 and 2, as a support for section E when extended.

The operation is as follows: When in use, as shown in Fig. 1, spread the lower ends of the sections apart, the hooks $a^8$ on the upper front edge of side bars $d$ resting on the outwardly-projected ends $a^9$ of the bar D, which will prevent the sections A and E spreading farther out at their lower ends, and thus securing them in desired position. To extend the ladder, as shown in Fig. 2, draw the sections A and E slightly together and lift the hook $a^9$ on the end of the bar D over the hook $a^8$ on the end of side bars $d$, and turn the section E up, as shown in Fig. 2; the side bars resting on the shoulders $d^3$, the locking-cam $d^2$ drops down, and, engaging with the top of the step C, locks and holds the two sections in extended position, as shown in Fig. 2. To reverse the operation, raise the cam $d^2$ and fold down section E, the hooks $a^8$ passing under and raising up the hooks $a^9$, and when the hooks $a^9$ have dropped under the hooks $a^8$ spread the sections until the hooks are engaged; or, for convenience, the two sections may be folded together.

Having thus fully explained the nature and object of my invention, what I desire to secure by Letters Patent is—

1. In an extensible step-ladder, the supporting-plate B, provided with a socket adapted to receive the side bar, a journal-bearing in which the locking-bar may be rotated, and a shoulder-support for said locking-bar, substantially as described, and for the purpose set forth.

2. The combination, in an extensible step-ladder composed of two sections having a pivotal connection at their upper ends, of the plate B, hooks $a^8$, and locking-bar, substantially as described, and for the purpose set forth.

3. The combination, in an extensible step-ladder composed of two sections pivotally connected at their upper ends, of the supporting-plate B, hooks $a^8$, locking-bar D, and locking-cam $d^2$, substantially as described, and for the purpose set forth.

4. The combination, in an extensible step-ladder, of the supporting-plate B, journal-bearing $a^4$, and a rotatable locking-bar, D, having at each of its ends a downwardly and outwardly projected section, $a^6$, and an outwardly-projected section, $a^9$, substantially as described, and for the purpose set forth.

5. The combination, in an extensible step-ladder composed of two sections pivotally connected at their upper ends, of the foot-board C, having shoulders $d^2$, and the locking-cam, substantially as described and set forth.

In testimony whereof I have hereunto set my hand this 16th day of November, A. D. 1886.

FREDERICK E. KOHLER.

Witnesses:
W. K. MILLER,
CHAS. R. MILLER.